United States Patent
Oyama et al.

(10) Patent No.: US 9,527,542 B2
(45) Date of Patent: Dec. 27, 2016

(54) PERSONAL DIGITAL ASSISTANT ATTACHMENT STRUCTURE FOR SADDLE-RIDE VEHICLE

(71) Applicant: HONDA MOTOR CO., LTD., Tokyo (JP)

(72) Inventors: Takahiro Oyama, Wako (JP); Hisashi Murakami, Wako (JP); Tomohiro Hoshi, Wako (JP); Junya Ono, Wako (JP); Hiroyuki Kaneta, Wako (JP); Noriyuki Mori, Wako (JP); Tsubasa Nose, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 252 days.

(21) Appl. No.: 14/377,963

(22) PCT Filed: Feb. 26, 2013

(86) PCT No.: PCT/JP2013/054915
§ 371 (c)(1),
(2) Date: Aug. 11, 2014

(87) PCT Pub. No.: WO2013/133087
PCT Pub. Date: Sep. 12, 2013

(65) Prior Publication Data
US 2015/0014380 A1  Jan. 15, 2015

(30) Foreign Application Priority Data

Mar. 8, 2012 (JP) .................................. 2012-051592

(51) Int. Cl.
*B62J 11/00* (2006.01)
*H04M 1/06* (2006.01)
(Continued)

(52) U.S. Cl.
CPC ................. *B62J 11/00* (2013.01); *B62K 19/40* (2013.01); *H04M 1/06* (2013.01); *H04M 1/11* (2013.01);
(Continued)

(58) Field of Classification Search
CPC .. B60R 11/02; B60R 11/0252; B60R 11/0241; B62J 11/00; B62J 2099/0026; B62J 2099/0033; B62K 19/40; B62K 2202/00; H04M 1/06; H04M 1/11
See application file for complete search history.

(56) References Cited

U.S. PATENT DOCUMENTS

2002/0145850 A1   10/2002   Chang
2005/0029772 A1   2/2005    Oi
(Continued)

FOREIGN PATENT DOCUMENTS

CN            1287076 A       3/2001
CN            101746442       6/2010
(Continued)

OTHER PUBLICATIONS

European Search Report dated Oct. 7, 2015, 8 pages.
(Continued)

*Primary Examiner* — Corey Skurdal
(74) *Attorney, Agent, or Firm* — Rankin, Hill & Clark LLP

(57) ABSTRACT

A personal digital assistant attachment structure is used for a saddle-ride vehicle and removably attaches a personal digital assistant including a display screen to a vehicle body. The attachment structure includes a terminal holder that includes a connector cord and a supported portion and is provided separately from the vehicle body. The supported portion includes a cord holder and a holder terminal. The cord holder holds the connector cord and the holder terminal
(Continued)

is connected to the second end of the connector cord. A holder support, which is provided integrally with the vehicle body, is removably engaged with the supported portion to support the terminal holder, and includes a vehicle-body-side terminal. The vehicle-body-side terminal is removably connected to the holder terminal during engagement of the supported portion.

9 Claims, 9 Drawing Sheets

(51) Int. Cl.
 *H04M 1/11* (2006.01)
 *B62K 19/40* (2006.01)
 *B62J 99/00* (2009.01)
(52) U.S. Cl.
 CPC . *B62J 2099/0026* (2013.01); *B62J 2099/0033* (2013.01); *B62K 2202/00* (2013.01)

(56) References Cited

U.S. PATENT DOCUMENTS

| | | |
|---|---|---|
| 2005/0067203 A1 | 3/2005 | Uno |
| 2006/0052144 A1 | 3/2006 | Seil et al. |
| 2011/0157796 A1 | 6/2011 | Uchida |

FOREIGN PATENT DOCUMENTS

| | | |
|---|---|---|
| DE | 102007045515 | 4/2009 |
| JP | 2001-071967 | 3/2001 |
| JP | 3082695 U | 10/2001 |
| JP | 2003-137161 | 5/2003 |
| JP | 2007-336734 | 12/2007 |
| JP | 2009-189169 | 8/2009 |

OTHER PUBLICATIONS

Japanese Notice of Allowance with English Translation dated Apr. 21, 2015, 6 pages.
International Search Report, Date of Mailing: May 21, 2013 (May 21, 2005).
Chinese Office Action dated Sep. 29, 2016 with English Translation, 15 pages.

PERSONAL DIGITAL ASSISTANT ATTACHMENT STRUCTURE FOR SADDLE-RIDE VEHICLE

CROSS-REFERENCE TO RELATED APPLICATION

This is the U.S. National Phase application under 35 U.S.C. §371 of International Patent Application No. PCT/JP2013/054915 filed Feb. 26, 2013, which designated the United States and was published in a language other than English, which claims the benefit of Japanese Patent Application No. 2012-051592 filed on Mar. 8, 2012, both of them are incorporated by reference herein. The International application was published in Japanese on Sep. 12, 2013 as WO2013/133087 A1 under PCT Article 21(2).

BACKGROUND OF THE INVENTION

Field of the Invention

The present invention relates to a personal digital assistant attachment structure for a saddle-ride vehicle such as a motorcycle.

Description of the Related Art

Japanese Unexamined Patent Application. First Publication No. 2003-137161 (hereinafter, referred to as Patent Document 1) discloses that, in a motorcycle to which a personal digital assistant such as a portable telephone is removably attached, a structure in which a recess-shaped terminal holder is provided which holds the personal digital assistant in an upright state in front of a meter unit provided at the center of the bar handle.

In the disclosure of Patent Document 1, as a result of providing this structure, radio communication between the personal digital assistant and the motorcycle, displaying a variety of vehicle information on the personal digital assistant, and non-contact charge of the personal digital assistant can be carried out.

However, in the aforementioned related art, the recess-shaped terminal holder is provided in front of the meter unit.

Consequently, there is a problem in that the holder is limited to the attachment of a predetermined size of a personal digital assistant or a predetermined type thereof.

Additionally, in the case where the personal digital assistant does not correspond to a motorcycle being used, there is a problem in that communicating and charging of the personal digital assistant cannot be carried out.

SUMMARY OF THE INVENTION

For this reason, the invention provides the personal digital assistant attachment structure for a saddle-ride vehicle, in which a personal digital assistant can be attached to a terminal holder provided on the vehicle body regardless of the size or the type of the personal digital assistant, and communicating and charging of the personal digital assistant can be carried out.

A personal digital assistant attachment structure according to one aspect of the invention, which serves as a means to solve the above-mentioned problem and is used for a saddle-ride vehicle, is a personal digital assistant attachment structure for a saddle-ride vehicle, removably attaching a personal digital assistant including a display screen to a vehicle body. The attachment structure includes: a terminal holder that includes a connector cord and a supported portion, is provided separately from the vehicle body, is removably provided on the vehicle body, and holds the personal digital assistant, the connector cord including a first end and a second end different from the first end, the first end being connected to the personal digital assistant so that the first end is capable of supplying at least one of electric power and data to the personal digital assistant from the vehicle body, the supported portion including a cord holder and a holder terminal, the supported portion fixedly holding the holder terminal, the cord holder holding the connector cord, the holder terminal being connected to the second end of the connector cord; and a holder support that is provided integrally with the vehicle body, is removably engaged with the supported portion and to support the terminal holder, and includes a vehicle-body-side terminal, the vehicle-body-side terminal being removably connected to the holder terminal during engagement of the supported portion.

Particularly, the saddle-ride vehicle means general vehicles on which a driver straddles and is seated, such as a motorcycle (including a motorized bicycle and a scooter-type vehicle), a three wheeled vehicle (including a vehicle provided with front-two wheels and rear-single wheel in addition to a vehicle provided with a front-single wheel and rear-two wheels), or a four-wheeled vehicle.

It may have a lock mechanism that is provided between the holder support and the supported portion, and limits the supported portion engaged with the holder support from being removed from the holder support.

It may be that a plurality of supported portions are provided at the holder support, the cord holder is provided in at least one of the supported portions, and the lock mechanism is provided between the holder support and at least one of the supported portions at which the cord holder is not provided.

It may be that the supported portion is formed in a rod shape, is inserted into the holder support in the longitudinal direction of the supported portion, and includes a narrow portion provided on an intermediate portion of the supported portion in the longitudinal direction, the holder support includes a fork advance-retreat mechanism that causes a fork member to move forward and backward in a direction orthogonal to the longitudinal direction and thereby causes the fork member to engage with and disengage from the narrow portion, and the lock mechanism is constituted of the narrow portion and the fork advance-retreat mechanism.

It may be that the supported portion is formed in a plate shape, is inserted into the holder support in a direction along a top surface and a back surface of the supported portion, and has a hole portion formed at a predetermined position on the top surface and the back surface, the holder support includes a pin advance-retreat mechanism that is used to cause a pin to move forward and backward in a direction orthogonal to the top surface and the back surface, and attach the pin to the hole portion and remove the pin from the hole portion, and the lock mechanism is constituted of the hole portion and the pin advance-retreat mechanism.

The personal digital assistant attachment structure for a saddle-ride vehicle according to one aspect of the invention may further include a vehicle-body-side fixation member provided at an attachment position of the personal digital assistant, wherein the terminal holder further includes: a case capable of accommodating the personal digital assistant; a spacer that is selected so as to correspond to the personal digital assistant and is accommodated in the case; a cover that covers an opening of the case; and a hinge that pivotally supports the cover so to be openable and closable with respect to the case, the supported portion is formed integrally with the terminal holder, and the cover has: a window that exposes a display screen of the personal digital assistant to outside of a holder; and an engagement portion that is to be engaged with the vehicle-body-side fixation member in a state where the case is closed during attachment of the terminal holder to the vehicle body and thereby limits an operation of opening the cover.

The personal digital assistant attachment structure for a saddle-ride vehicle according to one aspect of the invention may further include a vehicle-body-side fixation member provided at an attachment position of the personal digital assistant, wherein the terminal holder further includes: a case capable of accommodating the personal digital assistant; a spacer that is selected so as to match to the personal digital assistant and is accommodated in the case; a cover that covers an opening of the case; and a hinge that pivotally supports the cover so to be openable and closable with respect to the case, the supported portion is formed integrally with the terminal holder, and an engagement portion that is to be engaged with the cover in a state where the case is closed during attachment of the terminal holder and thereby limits an operation of opening the cover is provided on the vehicle-body-side fixation member.

It may be that the terminal holder includes a seal that is provided along an inner circumferential edge of a window of the cover so as to come into tight contact with the periphery of a display screen of the personal digital assistant inside the case when the cover is closed.

It may be that a light receiver that is used to capture an image of a front of the vehicle is provided on a front surface of the personal digital assistant during attachment thereof to the vehicle body, and an exposed hole that allows the light receiver to be exposed to the front of the vehicle is provided on the terminal holder.

EFFECTS OF THE INVENTION

According to the aspect of the invention, as a result of holding the personal digital assistant on the terminal holder that is separated from a vehicle body, attaching the terminal holder to the vehicle, and only causing the terminal holder to correspond to personal digital assistants which are different in the size or the type thereof, it is possible to attach the personal digital assistant to the vehicle.

Additionally, as a result of using the supported portion of the terminal holder and the holder support of the vehicle as a connector and connecting the personal digital assistant to a battery or a controller of the vehicle, it is possible to charge the personal digital assistant and it is possible to display a variety of vehicle information.

According to the aspect of the invention, it is possible to prevent the personal digital assistant from unintentionally dropping off and from being stolen in a state of being attached to the vehicle body.

According to the aspect of the invention, a cord-wiring path is easily ensured in one of the supported portions, and the lock mechanism can be configured by effectively utilizing a space around the supported portion other than the supported portion in which the cord-wiring path is ensured.

According to the aspect of the invention, a lock mechanism having a simplified configuration can be provided.

According to the aspect of the invention, during attachment of the terminal holder to the vehicle body, the display screen of personal digital assistant is visible from the outside of the holder, and it is possible to easily configure a constitution that limits an operation of opening the cover.

Additionally, as a result of replacement of the spacer, it is possible to simply and inexpensively accommodate the various types of personal digital assistant in the terminal holder.

According to the aspect of the invention, it is possible to prevent water, dust, or the like from entering the inside of the terminal holder through the window.

According to the aspect of the invention, the operation of the personal digital assistant and the vehicle can be controlled based on image information of the front of the vehicle which is obtained by the light receiver.

DETAILED DESCRIPTION OF THE INVENTION

Figure 1:
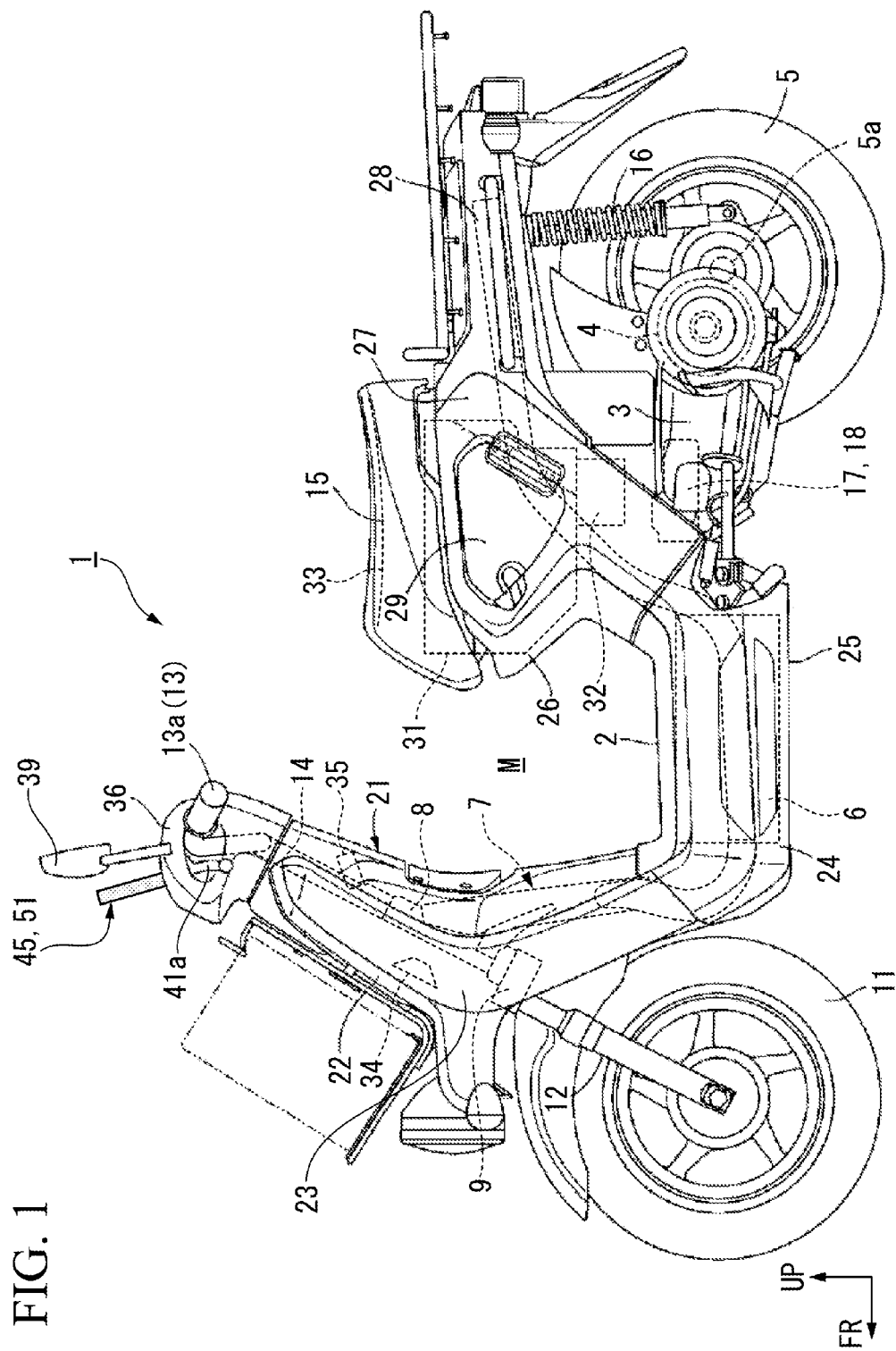
FIG. 1 is a left side view showing a motorcycle according to the first embodiment of the invention.

Hereinafter, a saddle-ride vehicle according to an embodiment of the invention will be described with reference to drawings.

Particularly, directions described below such as front, back, left, and right, and the like are identical to the directions of a vehicle described below unless otherwise specifically described.

Additionally, the arrow FR indicating the front direction of the vehicle, the arrow LH indicating the left direction of the vehicle, and the arrow UP indicating the upper direction of the vehicle are suitably shown in the drawings used for explanation described below.

<First Embodiment>

A motorcycle 1 shown in FIG. 1 is a scooter-type vehicle having a low floor 2, rotationally drives a rear wheel 5 that is pivotally supported by a wheel shaft 5a provided at a rear end of a rear swing arm 3 due to rotational power of an electric motor 4 built in the rear swing arm 3, and thereby runs.

A battery case 6 is provided under the low floor 2, and the battery case accommodates a high voltage battery (not shown in the figure) of 48 to 72V in voltage and serves as a power supply for the electric motor 4, and BMU (Battery Managing Unit, not shown in the figure) that controls discharging and charging of the high voltage battery.

A vehicle body frame 7 of the motorcycle 1 includes a head pipe 8 that is on the front end portion thereof and is backward inclined with respect to the vertical direction.

A steering stem 9 is rotatably supported by the head pipe 8.

An upper end of right and left front forks 12 is supported by the steering stem 9, and a front wheel 11 is pivotally supported by the lower end of the right and left front forks.

The steering stem 9 includes a stem pipe (not shown in the figure) that is inserted into the head pipe 8 from the lower side thereof.

A steering bar handle 13 is rotatably and integrally attached to the stem pipe via a handle stem 14 at the protruding portion that upwardly protrudes from the head pipe 8 at the stem pipe.

A seat 15 on which an occupant is to be seated is provided rearward of the bar handle 13 with a straddle space M interposed therebetween.

The rear swing arm 3 has a front end portion that is supported by a pivot portion located at a lower portion of a vehicle body so as to be capable of swinging in the vertical direction.

Regarding the rear swing arm 3, a cantilever type such that the rear wheel 5 is pivotally supported by only an arm provided at the left side in the vehicle width direction is adopted.

The rear end of the left arm of the rear swing arm 3 is supported by the left-side rear end of the vehicle body frame 7 with a rear cushion 16 interposed therebetween.

In the rear swing arm 3, the electric motor 4, a centrifugal clutch (not shown in the figure) serving as a cut mechanism of rotating drive force, a reduction gear mechanism, and a PDU 17 (Power Drive Unit) that controls the output of the electric motor 4 are concentratedly arranged.

An ECU 18 (electronic control unit) is provided integrally with the PDU 17.

The vehicle body frame 7 of the motorcycle 1 is covered with a vehicle body cover 21 made of a synthetic resin material.

The vehicle body cover 21 includes: a front cover 22 that covers the front of the peripheral portion of the head pipe 8; a leg shield 23 that covers the rear of the peripheral portion of the head pipe 8; the low floor 2 on which the feet of the occupant seated on the seat 15 are mounted, which extends from the lower portion of the leg shield 23 to the rear, and which covers the battery case 6 from above; a pair of right and left floor side covers 24 that droop from the external side of the low floor 2; an under cover 25 that connects the lower edges of the paired right and left floor side covers 24; so as to cover the front of a lower space of the seat 15; a seat-front-lower-portion cover 26 that is provided upright from the rear end of the low floor 2; a pair of right and left side covers 27 that extend to the rear of the outside portion of the seat-front-lower-portion cover 26 so as to cover the side portions of the lower space of the seat 15; and a rear cover 28 that extends to the rear of the right and left side covers 27 so as to cover the rear wheel 5 from above.

A lid 29 that opens or closes a charging port of a high voltage battery provided inside the battery case 6 is provided on the left side cover 27.

An article storage box 31 which is openable and closable by the seat 15 is disposed in the lower space of the seat 15.

A low voltage battery 32 of 12V is disposed at a bottom portion the article storage box 31.

A seat sensor 33 that detects the occupant seated thereon is placed at a position close to the top surface of the seat 15 (seating surface).

A sound emitter 34 is disposed inside the front cover 22, and the sound emitter alerts someone that the own vehicle approaches the periphery thereof at extremely low speed.

A main key switch 35 including a key cylinder is disposed at the right side of the leg shield 23.

Figure 2:
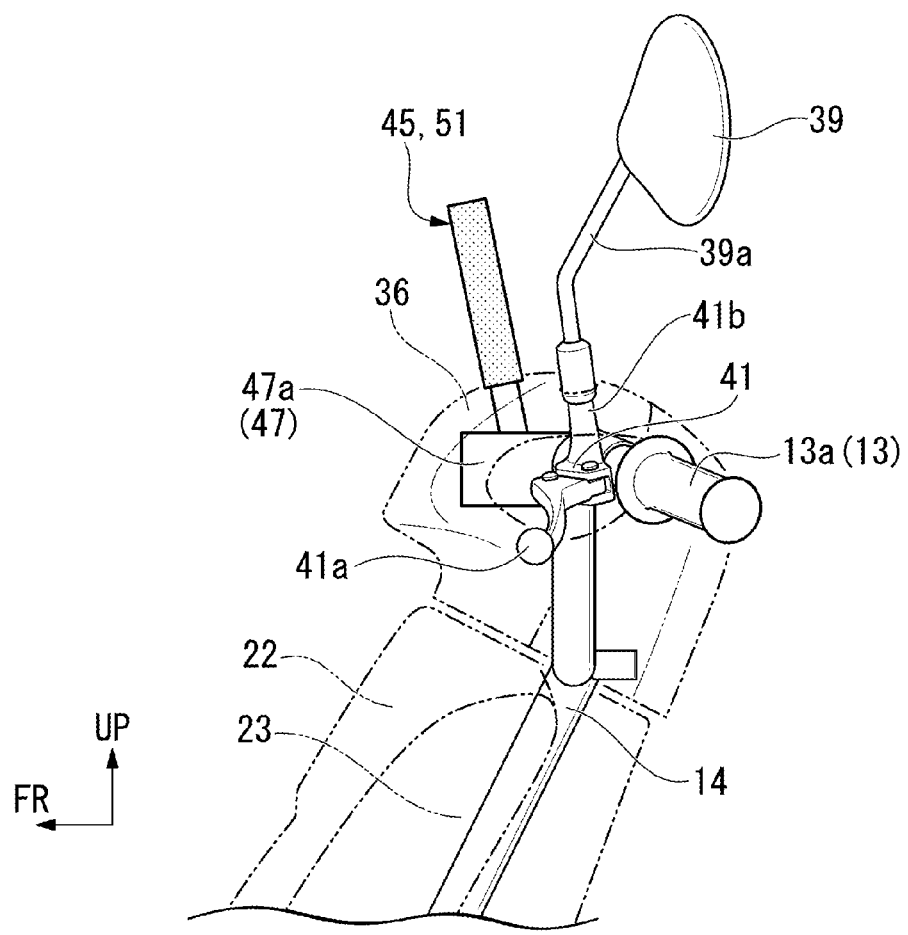
FIG. 2 is a left side view showing the periphery of a bar handle of the above-mentioned motorcycle.
Figure 3:
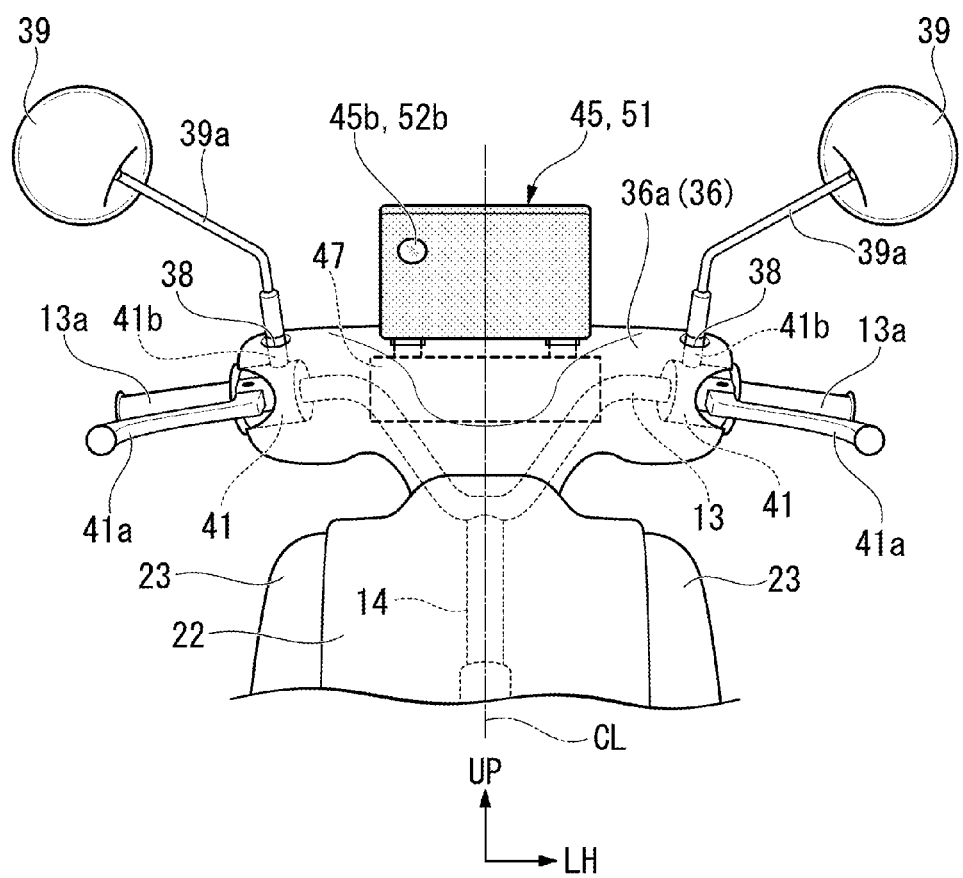
FIG. 3 is an anterior view showing the periphery of the aforementioned bar handle.
Figure 4:
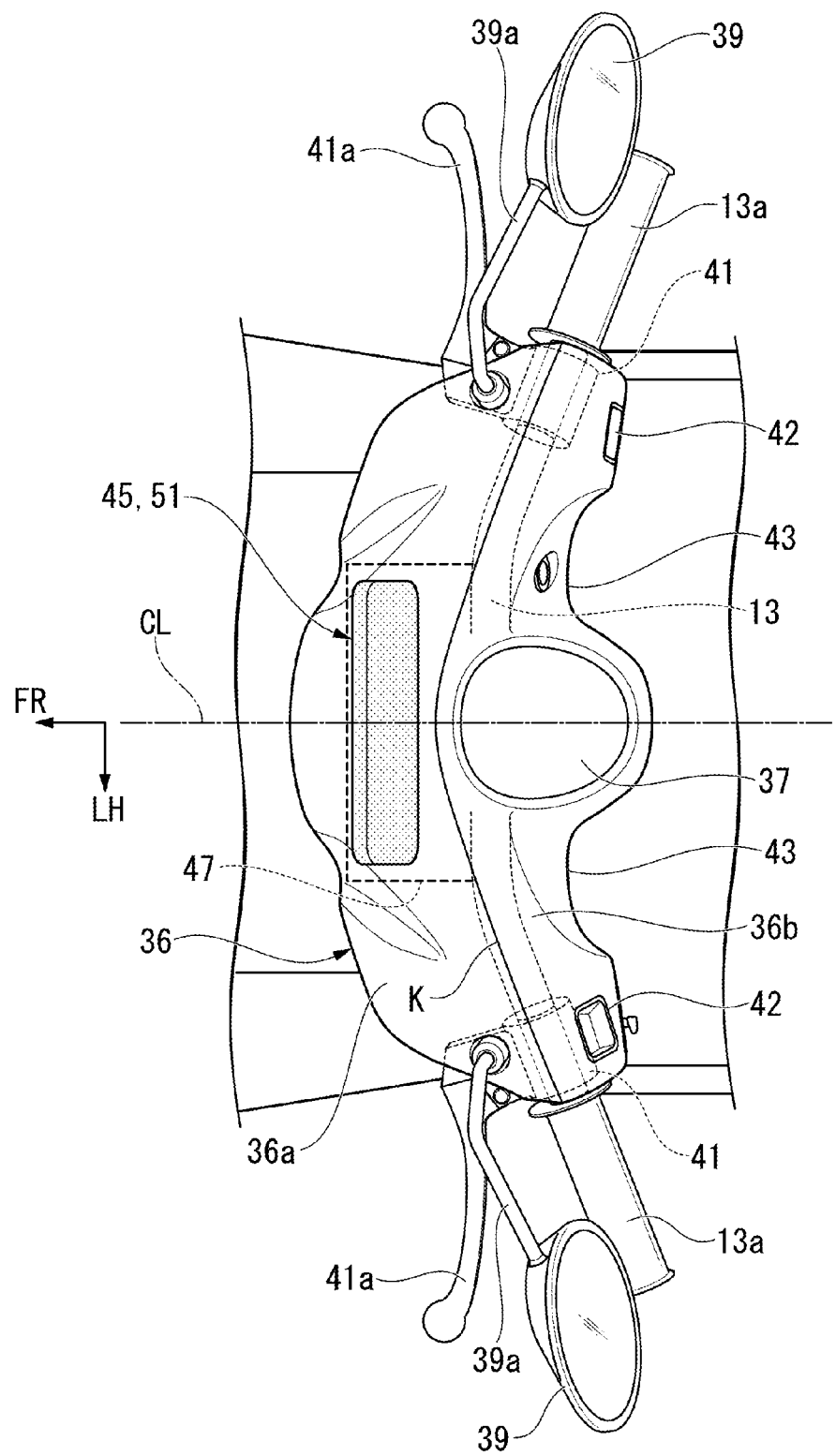
FIG. 4 is a top view showing the periphery of the aforementioned bar handle.

As shown in FIGS. 2 to 4, left and right handle grips 13a are provided at both right and left sides of the bar handle 13.

The center portion of the bar handle 13 is curved in a U-shape so as to protrude downward in a front view.

Except for the left and right handle grips 13a, the bar handle 13 is covered with a steering handlebar cover 36 that constitutes part of the vehicle body cover 21.

The line CL in the drawings indicates the center line that defines the right and left of the vehicle body.

The steering handlebar cover 36 is divisionally configured by: a steering-handlebar front cover 36a that covers the front of the bar handle 13; and a steering-handlebar rear cover 36b that covers the rear of the bar handle 13.

The line K in the drawings indicates the boundary line between the upper surface of the steering-handlebar front cover 36a and the upper surface of the steering-handlebar rear cover 36b.

A meter unit 37 including a speedometer or the like is provided on the center portion between the right and left of the steering-handlebar rear cover 36b.

Exposed holes 38 are provided on both the upper-right and upper-left sides of the steering-handlebar front cover 36a, the exposed holes allow mirror-fastening bosses 41b to be exposed to the outside of the cover, and the bosses are provided inside the steering handlebar cover 36.

The steering handlebar cover 36 is fixedly attached to the vehicle body, and a tool is necessary for attachment and replacement of the steering handlebar cover 36.

In the steering handlebar cover 36, lever holders 41 that support brake levers 41a are attached to the positions close to the base ends of the respective left and right handle grips 13a.

The mirror-fastening bosses 41b that tighten mirror stays 39a provided at the right and left rearview mirrors 39 are provided on the respective right and left lever holders 41 by integral molding or the like.

Operation switches 42 of a lamp unit or the like are provided on both the upper-right and upper-left sides of the steering-handlebar rear cover 36b.

The center portion is between the right and left of the steering-handlebar rear cover 36b, the meter unit 37 or the like are provided on the center portion, the switches 42 or the like are provided on both the right and left sides portions, and trailing edge configurations between the center portion and both the right and left sides portions is curved portions 43 having a projected shape that protrudes forward in a top view.

A holder support 47 that supports a terminal holder 51 is provided in the steering-handlebar front cover 36a, and the terminal holder holds (accommodates) a personal digital assistant 45 therein.

As the personal digital assistant 45, for example, a smartphone (a multifunction portable telephone provided with a PDA function) is adopted.

The personal digital assistant 45 includes a relatively large-scaled display screen 45a serving as a touch panel.

The personal digital assistant 45 can display an internet screen and a navigation screen using a GPS on the display screen 45a.

Furthermore, as a result of connecting the personal digital assistant 45 to the ECU 18 or the BMU, a variety of vehicle information of the motorcycle 1, information of a residual amount of battery of a high voltage battery inside the battery case 6, or the like can be displayed on the display screen 45*a*.

The holder support 47 is fixed integrally to the bar handle 13 by, for example, tightening or the like.

Figure 5:
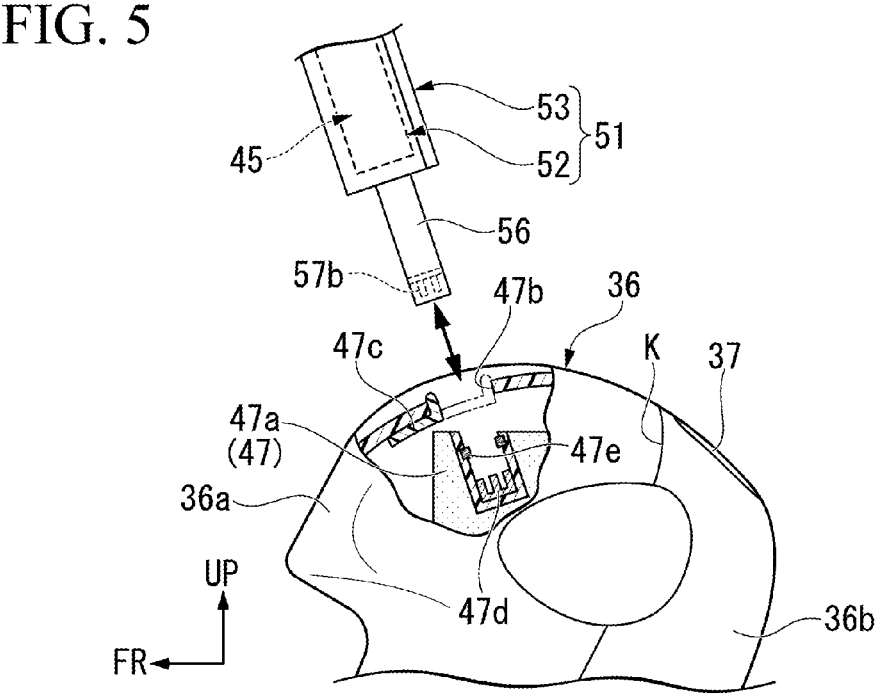
FIG. 5 is a left side view including a partial cross section of the periphery of a holder support that supports a terminal holder used to attach a personal digital assistant to the aforementioned motorcycle.
Figure 6:
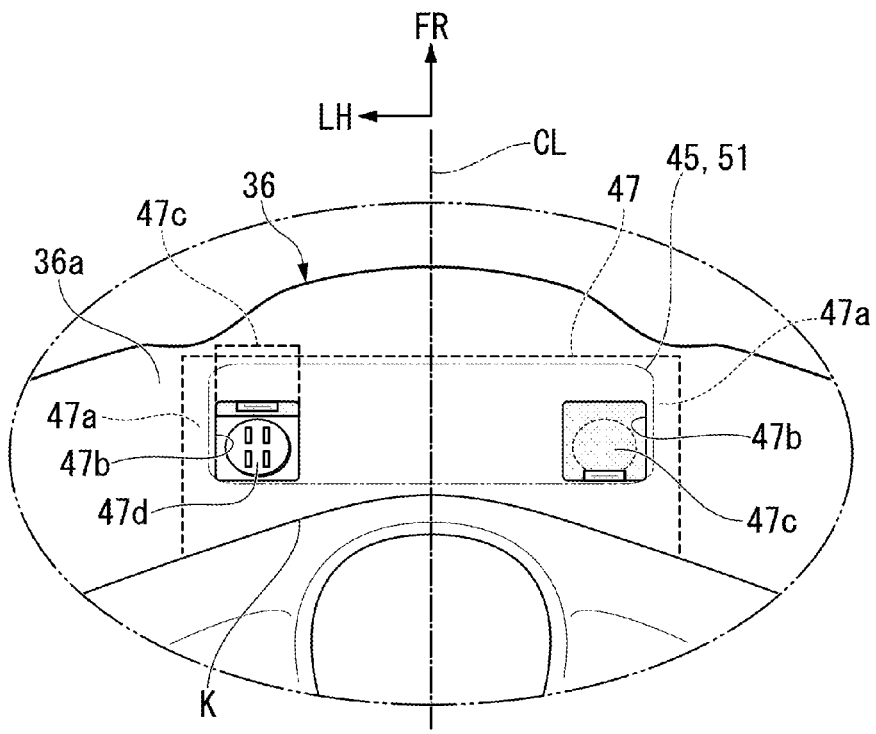
FIG. 6 is a top view showing the periphery of the aforementioned holder support.

As shown in FIGS. 5 and 6, the holder support 47 includes a pair of right and left leg supports 47*a* that hold a pair of right and left supporting legs 56 of the terminal holder 51 in a state where the paired right and left supporting legs 56 are inserted into the holder support.

A pair of right and left foot insertion holes 47*b* are formed on each of the upper-right side and upper-left side of the steering-handlebar front cover 36*a*.

The right and left supporting legs 56 of the terminal holder 51 are inserted through the foot insertion holes 47*b* and are fixed to the right and left leg supports 47*a* of the holder support 47 which are provided inside the steering-handlebar front cover 36*a*.

For example, a manual type shutter 47*c* capable of watertightly sealing the right and left foot insertion holes 47*b* is individually provided on each of the right and left foot insertion holes 47*b*.

Figure 7:
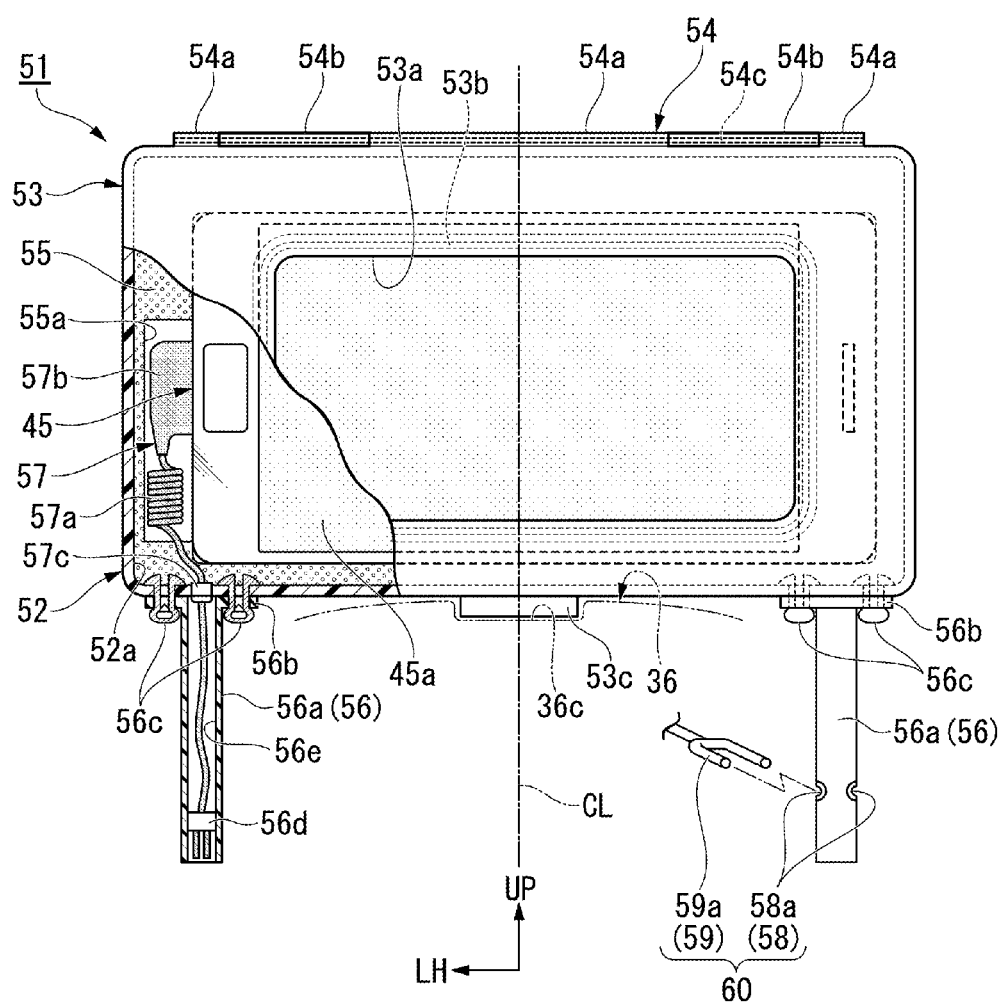
FIG. 7 is a front view showing the aforementioned terminal holder.

As shown in FIG. 7, the terminal holder 51 is formed in a case shape which is separated from the vehicle body of the motorcycle 1, accommodates and holds the personal digital assistant 45 thereinside, and can removably attach the personal digital assistant 45 to the vehicle body.

The terminal holder 51 is formed in a rectangular thick plate shape slightly larger than the personal digital assistant 45 so as to be able to accommodate the personal digital assistant 45 that is formed in a rectangular thick plate shape.

As shown in FIGS. 2 to 4, the personal digital assistant 45 and the terminal holder 51 are arranged in the position where the long side of the rectangle is parallel to the horizontal direction of the motorcycle 1 and both surfaces in the thickness direction of the personal digital assistant 45 and the terminal holder 51 are tilted slightly forward with respect to the vertical direction in a state of being directed to the front-back direction of the motorcycle 1 during attachment thereof to the vehicle body.

The display screen 45*a* of the personal digital assistant 45 is located to face the rear side (occupant side).

Figure 8:
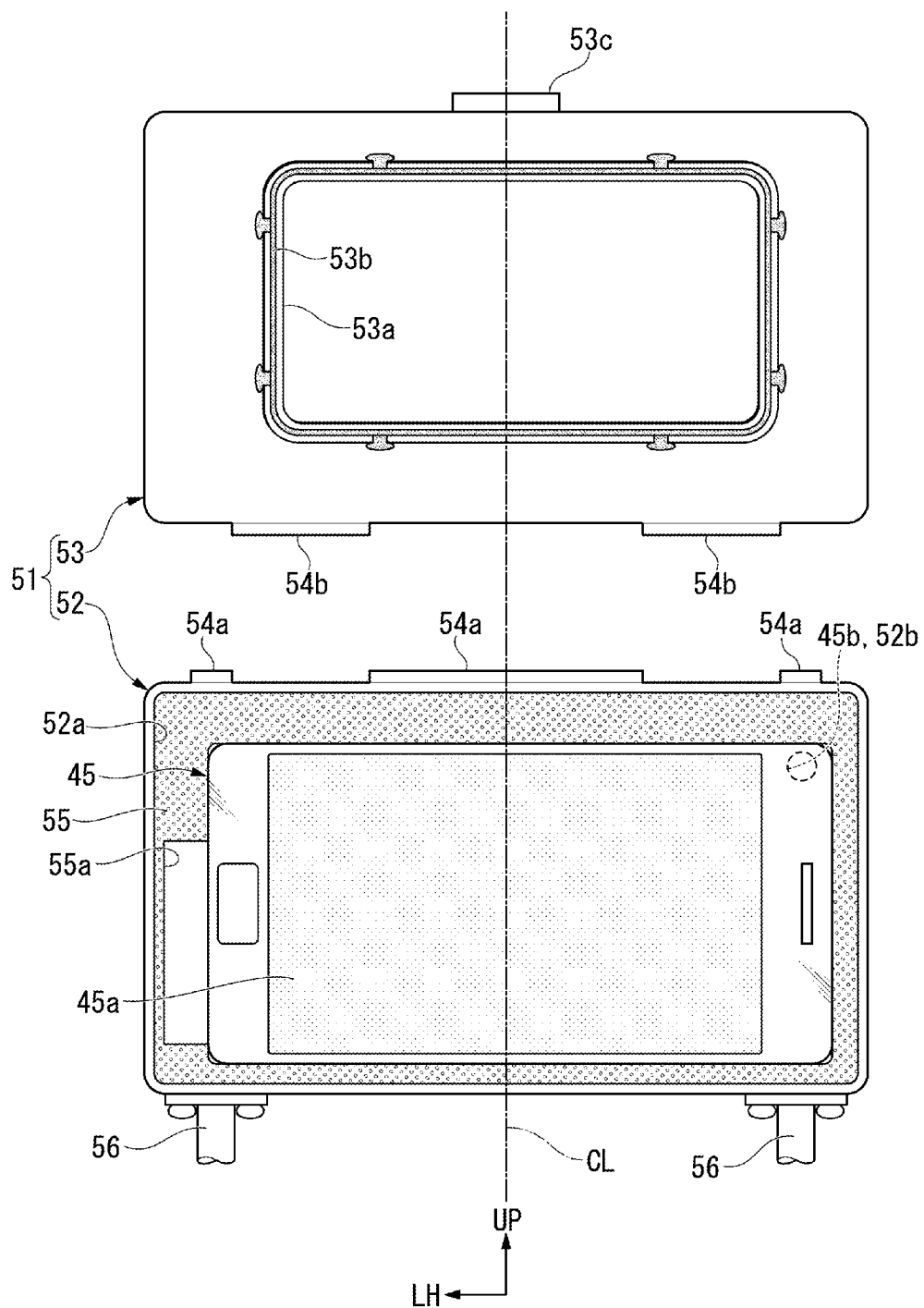
FIG. 8 is a front view showing the aforementioned terminal holder in an exploded state.

As shown in FIGS. 7 and 8, the terminal holder 51 includes: a case body 52 that is formed in a tray shape; a case cover 53 that covers an opening 52*a* provided on the case body 52; a hinge 54 that openably and closably supports the case cover 53 with respect to the case body 52; a spacer 55 that is selected so as to correspond to the personal digital assistant 45 and is accommodated in the case body 52; and the paired right and left supporting legs 56 that are provided integrally with the case body 52.

The case body 52 and the case cover 53 are made of, for example, a commodity plastic for vehicle use such as a PP resin or an ABS resin.

At least one of the case body 52 and the case cover 53 may be made of light metals such as aluminum alloys.

The case body 52 is attached to the vehicle body so that the opening 52*a* in the thickness direction thereof is directed to diagonal upper rearward (occupant side).

The measurements of the interior of the case body 52 are larger than and deeper than the outer sizes of the personal digital assistant 45.

The personal digital assistant 45 and the spacer 55 that is selected so as to correspond to the size or the type of the personal digital assistant 45 are accommodated in the case body 52 in a state of being positionally-fixed.

As shown in FIG. 3, a light receiver 45*b* is provided on the front surface of the personal digital assistant 45 which is directed to the front of the vehicle (surface on the opposite side of the display screen 45*a*) during attachment thereof to the vehicle. The light receiver and an imaging device that is provided in the housing of the personal digital assistant 45 constitute an imaging unit.

The light receiver 45*b* is arranged so that the optical axis of the lens of the light receiver 45*b* is parallel to the thickness direction of the personal digital assistant 45.

An exposed hole 52*b* that allows the light receiver 45*b* to be exposed to the outside of the holder (front of the vehicle) is formed at the portion of the case body 52 which faces the light receiver 45*b*.

In a state where the personal digital assistant 45 and the terminal holder 51 are attached to the vehicle body, the personal digital assistant 45 can capture an image of the front of the vehicle as an image through the exposed hole 52*b*.

In the case where a lamp (flash) is placed next to the light receiver 45*b*, the exposed hole 52*b* also allows the lamp to be exposed to the outside of the holder.

The exposed hole 52*b* may be provided on a plurality of portions so as to correspond to a plurality of kinds of the personal digital assistants 45.

As shown in FIGS. 7 and 8, after the case cover 53 is formed in a plate shape having the size equal to that of the opening 52*a* of the case body 52, the case cover is formed in a frame shape having a window 53*a* that is formed by cutting off the inner-periphery of the plate-shaped body.

The window 53*a* is provided on the region that faces the display screen 45*a* of the personal digital assistant 45 which is accommodated in the case body 52 (inside the terminal holder 51).

The display screen 45*a* of the personal digital assistant 45 which is accommodated in the case body 52 is exposed to the outside of the holder through the window 53*a*, so the occupant can look at the display screen 45*a*.

A seal member (not shown in the figure) is provided at the portion that faces the fringe of the opening 52*a* of the case body 52 of the case cover 53. The seal member comes into watertight contact with the fringe of the opening 52*a* when the opening 52*a* is closed.

The hinge 54 includes: hinge receivers 54*a* that are provided on the upper edge of the case body 52 during attachment thereof to the vehicle body and are formed by, for example, integral molding; hinge arms 54*b* that are provided to correspond to the hinge receivers 54*a* at the upper edge of the case cover 53 during attachment thereof to the vehicle body and are formed by, for example, integral molding; and a hinge shaft 54*c* that penetrates through the hinge receivers 54*a* and the hinge arms 54*b* along the upper edges of the case body 52 and the case cover 53 during attachment thereof to the vehicle body (along the horizontal direction during attachment thereof to the vehicle body).

It is preferable that the spacer 55 be formed of a member that is lightweight and inexpensive and has cushioning characteristics, is easy to process, and has shape-retaining characteristics such as urethane foam or synthetic rubber.

It is preferable that the spacer 55 is an integrally molded product; however, it may be partially divided or exchangeable.

Reference numeral 55*a* in the drawings indicates a recessed portion that accommodates a terminal-side connector 57*b* to be connected to the personal digital assistant 45.

The right and left supporting legs 56 are formed parallel to the front and back surfaces of the terminal holder 51 during attachment thereof to the vehicle, formed in a rod shape that extends in the direction parallel to the short side of the rectangular configuration, and inserted into the right and left leg supports 47a of the holder support 47 in the longitudinal direction thereof.

The insertion direction of the right and left supporting legs 56 is a plugging direction of the terminal holder 51 (the personal digital assistant 45) into the vehicle body.

Each of the right and left supporting legs 56 includes: a cylindrical leg main body 56a; and a fixing plate 56b that is formed in a plate shape, is disposed orthogonal to the cylinder axis of the leg main body 56a, and is secured to the upper end of the leg main body 56a during attachment thereof to the vehicle.

By suitably using synthetic resin materials, light alloy metals and a stainless steel, or the like, the leg main body 56a and the fixing plate 56b are formed.

The fixing plate 56b is fixed to the lower edge of the case body 52 during attachment thereof to the vehicle By use of, for example, rivets 56c or the like having waterproofness.

The right and left supporting legs 56 may be a folding-type leg, and the personal digital assistant 45 and the terminal holder 51 may be easily portable in a state where the personal digital assistant 45 is accommodated in the terminal holder 51.

A cord insert hole 56e is provided inside of one of the right and left supporting legs 56 (the supporting leg which is located at the position close to the terminal-side connector 57b, and the left supporting leg in the drawing) and a connector cord 57 is held therein.

The upper end of the connector cord 57 during attachment thereof to the vehicle extends to the inside of the terminal holder 51 and is connected to the terminal-side connector 57b.

Furthermore, a spiral cord 57a is formed at the upper end.

The lower end of the connector cord 57 during attachment thereof to the vehicle is connected to a holder-side connector 56d that is provided on the end portion of the left supporting leg 56 (the lower end of the left supporting leg 56 during attachment thereof to the vehicle).

The lower end of the connector cord 57 during attachment thereof to the vehicle is fixedly held by the left supporting leg 56; on the other hand, both the terminal-side connector 57b and the upper end of the connector cord 57 during attachment thereof to the vehicle can be exchanged so as to correspond to the personal digital assistant 45.

Reference numeral 57c in the drawings indicates an intermediate connector that is used to be able to separate the intermediate portion of the connector cord 57 therefrom.

The left supporting leg 56 may be attachable to and detachable from the case body 52 and the left supporting leg 56 and the connector cord 57 may be collectively exchangeable.

As shown in FIG. 5, as the left supporting leg 56 is inserted into the left leg support 47a of the holder support 47, the holder-side connector 56d is connected to a vehicle-body-side connector 47d that is provided in the left leg support 47a.

For this reason, during attachment of the personal digital assistant 45 and the terminal holder 51 to the vehicle body, the personal digital assistant 45 and the terminal holder 51 are electrically connected to a main harness or the like of the motorcycle 1, the personal digital assistant 45 obtains a variety of information from the ECU 18 or the BMU, and electric power of the low voltage battery 32 or the like can be used to charge the personal digital assistant 45.

Reference numeral 47e in the drawings indicates, for example, a waterproof seal that is fitted onto the inner peripheral face the left leg support 47a and is formed in a ring shape.

The waterproof seal 47e may be fitted onto the outer peripheral face of the left supporting leg 56. In this case, the waterproof seal 47e is less likely to drop in the left leg support 47a.

A narrow portion 58 is provided on the intermediate portion in the longitudinal direction of the other of the right and left supporting legs 56 (the right supporting leg shown in the drawings), and the narrow portion is to be engaged with a fork member 59a provided in the holder support 47.

As seen in the direction (e.g., the thickness direction of the terminal holder 51) orthogonal to the insertion direction (the plugging direction) of the right supporting leg 56 into the right leg support 47a, the narrow portion 58 includes semicircular recessed portions 58a that are formed on both edges of the right supporting leg 56 in the direction orthogonal to the insertion direction.

A fork advance-retreat mechanism 59 is provided in the right leg support 47a of the holder support 47, and the fork advance-retreat mechanism causes the fork member 59a having two forks to engage with the narrow portion 58 of the right supporting leg 56 in accordance with, for example, the insertion of the right supporting leg 56 thereinto.

The fork advance-retreat mechanism 59 causes the fork member 59a to move forward and backward in the thickness direction of the terminal holder 51 (the direction orthogonal to the plugging direction) by, for example, driving power of a solenoid.

The fork advance-retreat mechanism 59 causes the fork member 59a to move forward in accordance with, for example, the operation of insertion of the right supporting leg 56 and causes the fork member 59a to be engaged with the narrow portion 58 of the right supporting leg 56.

The narrow portion 58 and the fork advance-retreat mechanism 59 constitutes a lock mechanism 60 that limits the supporting leg 56 inserted into the leg support 47a from being removed from the leg support 47a (furthermore, removal of the terminal holder 51 attached to the vehicle body from the vehicle body).

It is only necessary that at least one of the combination of the left supporting leg 56 and the left leg support 47a and the combination of the right supporting leg 56 and the right leg support 47a be provided in the lock mechanism 60.

At this time, the connector cord 57 and the cord insert hole 56e are provided in the other supporting leg 56 on which the lock mechanism 60 is not provided.

Because of this, a cord-wiring path is easily ensured in the other supporting leg 56 and the lock mechanism 60 is easily formed on the periphery of the said one supporting leg 56 in which the connector cord 57 and the cord insert hole 56e are not provided.

In other cases where a space or the like used to arrange the lock mechanism 60 therein can be ensured, the lock mechanism 60 may be arranged at any one of the right and left supporting legs 56.

As a result of a predetermined operation or the like of, for example, the main key switch 35, the fork advance-retreat mechanism 59 causes the fork member 59a that is engaged with the narrow portion 58 to move backward.

Therefore, it is possible to remove (detach) the terminal holder 51 attached to the vehicle body from the vehicle body.

A system may be adopted which causes the fork member 59a to be engaged with the supporting leg 56 by a predetermined operation or the like of the main key switch 35.

Engagement portion of the supporting leg 56 with which the fork member 59a is to be engaged is not limited to the narrow portion 58 that is obtained by depressing a side edge thereof so that the fork member 59a is engaged with the side edge. The engagement portion may be a depressed portion or a hole portion which causes the fork member 59a to engage with and disengage from the fork member 59a in the forward and backward direction.

With respect to the terminal holder 51, as an operation of releasing the lock thereof which is carried out by the lock mechanism 60, the operation of the main key switch 35 is adopted.

However, there is the case of a keyless entry where a smart key system is adopted in the motorcycle 1 and a main switch operation or the like is activated based on ID certification or the like by radio communication between a user's portable key terminal and the motorcycle 1. In this case, a valid operation such as using the main switch or the like may be carried out as the operation of releasing the lock of removal of the terminal holder 51.

At this time, as the key terminal, the personal digital assistant 45 may be used.

A packing 53b is attached to the inner surface of the case cover 53 (front surface, surface located at the position close to the case body 52), and the packing is formed in a frame shape that is along the inner circumferential edge of the window 53a as seen in the thickness direction of the terminal holder 51.

The packing 53b is formed of, for example, a urethane foam material or the like and comes into watertight contact with the position close to the outer circumferential edge of the display screen 45a of the personal digital assistant 45 disposed in the case body 52 when the case cover 53 is closed.

By means of this structure, water is prevented from entering the inside of the terminal holder 51 through the window 53a in a state where the case cover 53 is closed.

In the case where the window 53a is opened, even where the display screen 45a of the personal digital assistant 45 serves as a touch panel, it is possible to operate the display screen 45a.

In the case where the window 53a is sealed by a hard transparent member such as an acrylic plate, the display screen 45a cannot be touched.

On the other hand, the degree of waterproofness of the terminal holder 51 is high.

In the case where the window 53a is sealed by a transparent film that is located adjacent to the display screen 45a and in the case where the display screen 45a is a pressure-sensitive touch panel, it is possible to operate the display screen 45a, and a degree of waterproofness of the terminal holder 51 is high.

In the case where the window 53a is sealed by a conductive transparent film that is located adjacent to the display screen 45a, even in the case where the display screen 45a of the personal digital assistant 45 is an electrostatic touch panel, it is possible to operate the display screen 45a, and a degree of waterproofness of the terminal holder 51 is high.

In the case where the window 53a is sealed, the degree of freedom in application of the window 53a or the packing 53b to the personal digital assistant 45 is high.

A protuberance 53c is provided on the lower edge of the case cover 53 during attachment thereof to the vehicle body by, for example, integral molding, and the protuberance protrudes downward therefrom in the direction parallel to the supporting legs 56.

In accordance with an operation of attaching the terminal holder 51 to the vehicle body, and the protuberance limits the operation of opening the case cover 53, the protuberance 53c (engagement portion) is fitted into a recessed portion 36c that is provided on, for example, the upper portion of the steering-handlebar front cover 36a from above.

Accordingly, the operation of opening the case cover 53 is easily and reliably limited when the terminal holder 51 is attached to the vehicle body.

Figure 10:
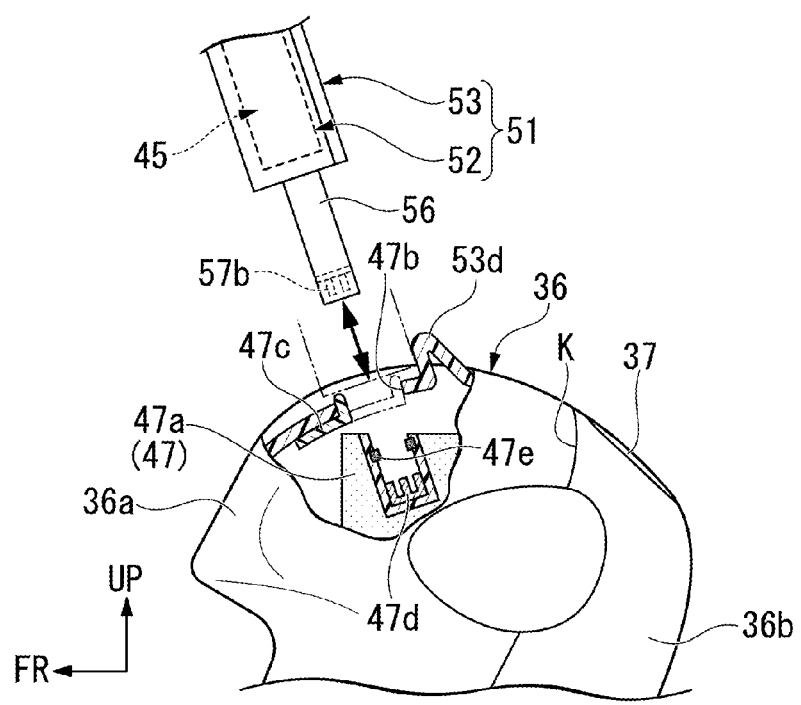
FIG. 10 is a left side view showing the periphery of a modified example of the aforementioned holder support and corresponding to FIG. 5.

In such opening-operation limiting mechanism, the operation of opening the case cover 53 may be limited as a result of replacing the protuberance provided on the case cover 53 with the recessed portion, as a result of replacing the recessed portion provided on the steering-handlebar front cover 36a with the protuberance, or as a result of causing the bottom rear surface of the case cover 53 during attachment thereof to the vehicle body to come into butt-contact with the protuberance 53d provided on the upper portion of the steering-handlebar front cover 36a as shown in FIG. 10.

By eliminating the protuberance of the terminal holder 51, the bulkiness of the terminal holder 51 while being carried is reduced.

The personal digital assistant 45 can also output sounds by use of a speaker provided in the personal digital assistant 45 and can also output sounds by use of the communication between the personal digital assistant 45 and a head set (income) provided in a riding helmet.

As a means of communication between the personal digital assistant 45 and the target device (the above-described ECU, BMU, head set, or the like), any one of radio communication and cable communication may be adopted.

In the case where the means of communication is radio communication, it is thought that a radio-communication transmitting and receiving unit that adopts a short-distance radio communication standard such as Bluetooth (registered trademark) is provided in or connected to each of the personal digital assistant 45 and the target device.

In the case where the means of communication is cable communication, it is necessary to draw a wiring that connects the personal digital assistant 45 to the target device; however, the personal digital assistant 45 is easily charged by a vehicle-mounted battery.

The charging of the personal digital assistant 45 may be carried out by a non-contact charging system such as a system utilizing electromagnetic induction between coils that are provided the respective terminal holder 51 and the vehicle body.

As described above, the attachment structure of the personal digital assistant 45 to the motorcycle 1 according to the aforementioned embodiment includes: the terminal holder 51 that removably attaches the personal digital assistant 45 including the display screen 45a to the vehicle body, is provided separately from the vehicle body, and holds the personal digital assistant 45; and the holder support 47 that is provided integrally with the vehicle body and supports the terminal holder 51.

The terminal holder 51 includes: the supporting legs 56 that are to be removably engaged with the holder support 47; and the connector cord 57 has the first end that is to be connected to the personal digital assistant 45 so that the first end is capable of supplying at least one of electric power and data to the personal digital assistant 45 from the vehicle-body-side.

The supporting leg 56 includes: the cord insert hole 56e that holds the connector cord 57; and the holder-side connector 56d that connects the second end of the connector cord 57 (the second end on the opposite side of the first end) thereto.

The holder support 47 includes the vehicle-body-side connector 47d that is removably connected to the holder-side connector 56d during engagement of the supporting legs 56.

According to this configuration, since the personal digital assistant 45 is attached to the vehicle in a state where the personal digital assistant 45 is held to the terminal holder 51 that is provided separately from the vehicle body, personal digital assistants 45 which are different in the size or the type thereof can be attached to the vehicle by only selecting a terminal holder 51 so as to correspond to the personal digital assistant 45.

Moreover, as a result of using the supporting leg 56 of the terminal holder 51 and the holder support 47 of the vehicle as connectors and connecting the personal digital assistant 45 to a battery or a controller of the vehicle, charging of the personal digital assistant 45 or displaying a variety of vehicle information can be carried out.

Furthermore, since the above-mentioned personal digital assistant attachment structure configures the lock mechanism 60 that is between the holder support 47 and the supporting leg 56 and limits the supporting leg 56 engaged with the holder support 47 from being removed therefrom, it is possible to prevent the personal digital assistant 45 from unintentionally dropping off and from being stolen in a state of being attached to the vehicle body.

Moreover, in the above-mentioned personal digital assistant attachment structure, a plurality of the supporting legs 56 (one pair) is provided, the cord insert hole 56e is provided in one of the supporting legs 56, and the lock mechanism 60 is provided between the holder support 47 and the other of the supporting legs 56 in which the cord insert hole 56e is not provided. Therefore, a cord-wiring path is easily ensured in one of the supporting legs 56, and the lock mechanism 60 can be configured by effectively utilizing a space around the other of the supporting legs 56 in which the cord insert hole 56e is not provided.

In other cases where three or more supporting legs 56 are provided, the supporting legs may be configured so that a cord holder is provided in at least one of the supporting legs 56 and a lock mechanism is provided around at least one of the other supporting legs.

Furthermore, in the above-described personal digital assistant attachment structure, the supporting legs 56 are is formed in a rod shape, are inserted in the holder support 47 in the longitudinal direction thereof, and have the narrow portion 58 on the intermediate portion in the longitudinal direction. The holder support 47 includes the fork advance-retreat mechanism 59 that causes the fork member 59a to move forward and backward in the direction orthogonal to the longitudinal direction and causes the fork member 59a to be engaged with and disengaged from the narrow portion 58. As a result of configuring the lock mechanism 60 by the narrow portion 58 and the fork advance-retreat mechanism 59, the lock mechanism 60 having a simplified configuration can be provided.

Additionally, in the aforementioned personal digital assistant attachment structure, the terminal holder 51 includes: the case body 52 that is integrally with the supporting legs 56 and can accommodate the personal digital assistant 45 therein; the spacer 55 that is selected so as to correspond to the personal digital assistant 45 and is accommodated in the case body 52; the case cover 53 that covers the opening 52a of the case body 52; and the hinge 54 that pivotally supports the case cover 53 to be openable and closable with respect to the case body 52. The case cover 53 includes: the window 53a that allows the display screen 45a of the personal digital assistant 45 to be exposed to the outside of the holder; and the protuberance 53c that is engaged with the steering handlebar cover 36 in a state where the case body 52 is closed during attachment of the terminal holder 51 to the vehicle body and limits the opening operation thereof.

Consequently, the display screen 45a of the personal digital assistant 45 is visible from the outside of the holder during attachment of the terminal holder 51 to the vehicle body, and a structure that limits the operation of opening the case cover 53 can be simply configured.

Furthermore, as a result of replacement of the spacer 55, it is possible to simply and inexpensively accommodate the various types of personal digital assistant 45 in the terminal holder 51.

Moreover, in the above-described personal digital assistant attachment structure, the protuberance 53d is provided on the steering handlebar cover 36 that is provided at the attachment position of the personal digital assistant 45, and the protuberance is engaged with the case cover 53 in a state where the case body 52 is closed at the time of attachment of the terminal holder 51 and limits the operation of opening the case cover 53.

For this reason, in addition to the above-mentioned actions and effects, the bulkiness of the terminal holder 51 while being carried after the terminal holder 51 is removed from the vehicle body is reduced.

Additionally, in the aforementioned personal digital assistant attachment structure, the terminal holder 51 includes the packing 53b that is along the inner circumferential edge of the window 53a of the case cover 53 so as to come into tight contact with the periphery of the display screen 45a of the personal digital assistant 45 disposed inside the case body 52 when the case cover 53 is closed.

By means of this structure, it is possible to prevent water, dust, or the like from entering the inside of the terminal holder 51 through the window 53a.

Furthermore, in the above-described personal digital assistant attachment structure, the light receiver 45b that is used to capture an image of the front of the vehicle is provided on the front surface of the personal digital assistant 45 during attachment thereof to the vehicle body, and the exposed hole 52b that allows the light receiver 45b to be exposed to the front of the vehicle is provided on the terminal holder 51.

Accordingly, the operation of the personal digital assistant 45 and the vehicle can be controlled based on image information of the front of the vehicle which is obtained by the light receiver 45b.

<Second Embodiment>

Figure 9:
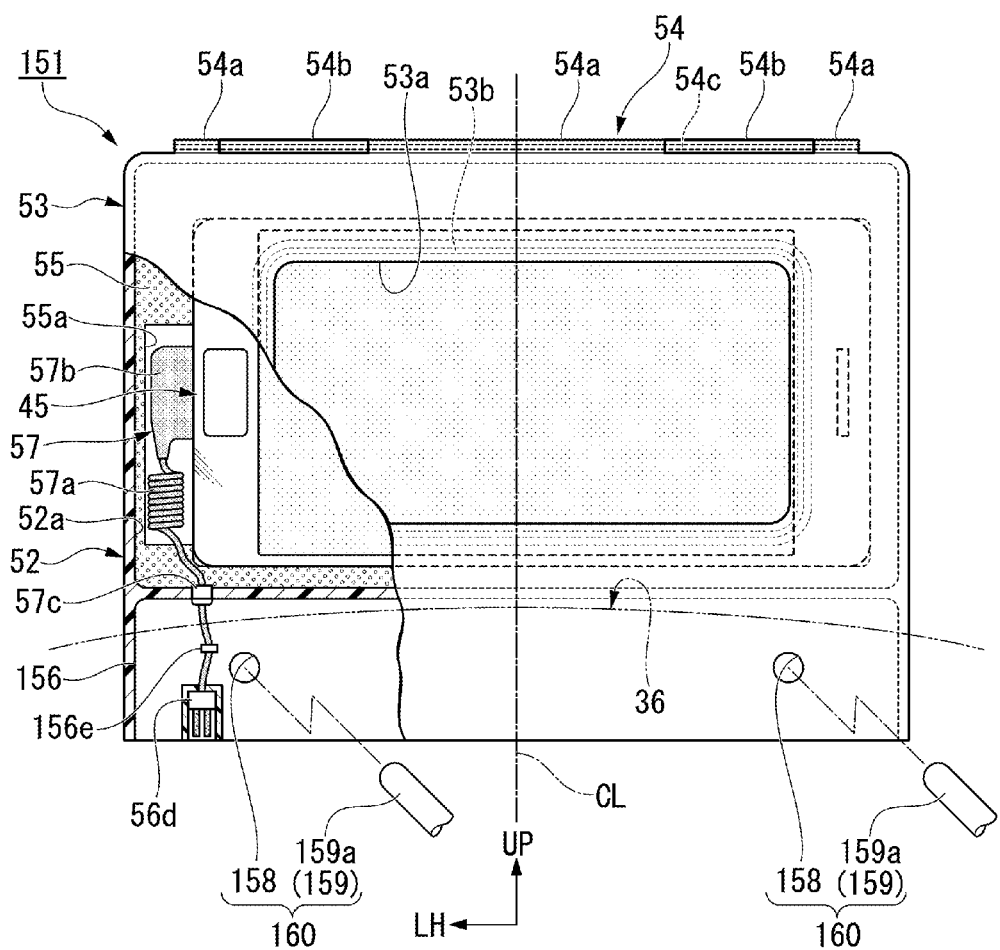
FIG. 9 is a front view showing a terminal holder according to the second embodiment of the invention.

Next, the second embodiment of the invention will be described with reference to FIG. 9.

The embodiment is particularly different from the first embodiment in that a terminal holder 151 is provided instead of the right and left supporting legs 56. The terminal holder includes a supported portion 156 that is formed in a plate shape such that the case body 52 and the lower edge of the case cover 53 extend downward during attachment thereof to the vehicle.

Identical symbols are used for the constituent elements which are identical to those of the above-described embodiment, and the specific explanations thereof are omitted here.

The holder support 47 includes a supported portion (not shown in the figure) into which the plate-shape supported portion 156 of the terminal holder 151 is inserted in the direction along the surface of the supported portion 156, and the supported portion holds it.

A slit-shaped insertion hole long in the right and left (not shown in the figure) is formed on the upper portion of the steering-handlebar front cover 36a.

Additionally, the supported portion 156 of the terminal holder 151 reaches the holder support 47 provided inside the cover through the insertion hole.

For example, a manual type shutter (not shown in the figure) capable of watertightly sealing the insertion hole is provided on the insertion hole.

The terminal holder 151 includes the case body 52, the case cover 53, the hinge 54, and the spacer 55.

By integral molding, extension portions extending downward are provided on the lower edges of the case body 52 and the case cover 53 during attachment thereof to the vehicle, both extension portions overlap each other when the case cover 53 is closed, and the supported portion 156 is thereby formed.

The supported portion 156 is inserted into the holder support 47 along the plugging direction.

The connector cord 57 is held inside the portion (the left portion in the drawing) close to the terminal-side connector 57b of the supported portion 156.

Reference numeral 156e in the drawing indicates a cord clip that holds the connector cord 57 inside the supported portion 156.

The holder-side connector 56d is provided at the lower end of the supported portion 156 at the left portion thereof during attachment thereof to the vehicle.

The exposed hole 52b which is not shown in the figure and corresponds to the light receiver 45b of the personal digital assistant 45 is provided on the terminal holder 151.

Hole portions 158 are provided on, for example, the right and left portions of the front and back surfaces of the supported portion 156 during attachment thereof to the vehicle, and pins 159a provided in the holder support 47 are engaged with the hole portions.

Pin advance-retreat mechanisms 159 are provided in the respective right and left portions of the holder support 47, the advance-retreat mechanisms allow the right and left pins 159a to be respectively fitted into the right and left hole portions 158 of the supported portion 156 in accordance with, for example, insertion of the supported portion 156 thereinto.

The forward and backward directions of the right and left pins 159a are the direction orthogonal to the front and back surfaces (thickness direction of the terminal holder 151).

The configuration and operation of the pin advance-retreat mechanism 159 are similar to the configuration and operation of the fork advance-retreat mechanism 59.

The above right and left hole portions 158 and the pin advance-retreat mechanisms 159 constitutes a lock mechanism 160 that limits the supported portion 156 inserted into the holder support 47 from being removed from the holder support 47 (furthermore, removal of the terminal holder 151 attached to the vehicle body from the vehicle body).

As described above, also in the personal digital assistant attachment structure of the vehicle according to the above-mentioned embodiment, similar to the first embodiment, personal digital assistants 45 which are different in the size or the type thereof can be attached to the vehicle by only selecting the terminal holder 151 so as to correspond to the personal digital assistant 45, and charging of the personal digital assistant 45 or displaying a variety of vehicle information can be carried out.

Particularly, in the above-described personal digital assistant attachment structure, the supported portion 156 of the terminal holder 151 is formed in a plate shape, is inserted into the holder support 47 in the direction along the top surface and the back surface (the extending direction of the supported portion 156), and has the hole portions 158 at predetermined positions of the top surface and the back surface. The holder support 47 has the pin advance-retreat mechanism 159 that causes the pin 159a to move forward and backward in the direction orthogonal to the top surface and the back surface and is used to carry out the attachment of the pins 159a to the hole portions 158 and the removal thereof from the hole portions 158. The hole portions 158 and the pin advance-retreat mechanism 159 constitute the lock mechanism 160.

Accordingly, the lock mechanism 160 having a simplified configuration can be provided.

Particularly, the invention is not limited to the above-mentioned embodiments. In the case where the personal digital assistant 45 senses a pedestrian by image-capturing in, for example, a state of extremely low speed, the personal digital assistant may produce a sound by a speaker or lamp lighting and thereby alert the pedestrian who approaches the vehicle.

The speaker or the lamp may be provided on the personal digital assistant 45 or mounted on the vehicle.

The personal digital assistant of the invention is not limited to the smartphone of the above-described embodiments and may be a relatively large-scaled tablet device.

Particularly, the saddle-ride vehicle means general vehicles on which a driver straddles and is seated, such as a motorcycle (including a motorized bicycle and a scooter-type vehicle), a three wheeled vehicle (including a vehicle provided with front-two wheels and rear-single wheel in addition to a vehicle provided with a front-single wheel and rear-two wheels), a four-wheeled vehicle, or a vehicle provided with a motor serving as an internal combustion engine.

Additionally, the constitution of the aforementioned embodiment is an example of the invention, and various modifications may be made without departing from the scope of the invention.

The invention claimed is:

1. A personal digital assistant attachment structure for a saddle-ride vehicle, removably attaching a personal digital assistant including a display screen to a vehicle body, the attachment structure comprising:
a terminal holder that comprises a connector cord and a supported portion, is provided separately from the vehicle body, is removably provided on the vehicle body, and holds the personal digital assistant, the connector cord comprising a first end and a second end different from the first end, the first end being connected to the personal digital assistant so that the first end is capable of supplying at least one of electric power and data to the personal digital assistant from the vehicle body, the supported portion comprising a cord holder and a holder terminal, the supported portion fixedly holding the holder terminal, the cord holder holding the connector cord, the holder terminal being connected to the second end of the connector cord;
a holder support that is provided integrally with the vehicle body, is removably engaged with the supported portion and to support the terminal holder, and comprises a vehicle-body-side terminal, the vehicle-bodyside terminal being removably connected to the holder terminal during engagement of the supported portion; and a vehicle-body-side fixation member provided at an attachment position of the personal digital assistant, wherein the terminal holder further comprises: a case capable of accommodating the personal digital assistant; a spacer that is selected so as to correspond to the personal digital assistant and is accommodated in the case; a cover that covers an opening of the case; and a hinge that pivotally supports the cover so to be openable and closable with respect to the case, the supported portion is formed integrally with the terminal holder, and the cover has: a window that exposes a display screen of the personal digital assistant to outside of a holder; and an engagement portion that is to be engaged with the vehicle-body-side fixation member in a state where the case is closed during attachment of the terminal holder to the vehicle body and thereby limits an operation of opening the cover.

2. The personal digital assistant attachment structure for a saddle-ride vehicle according to claim 1, further comprising:
 a lock mechanism that is provided between the holder support and the supported portion, and limits the supported portion engaged with the holder support from being removed from the holder support.

3. The personal digital assistant attachment structure for a saddle-ride vehicle according to claim 2, wherein
 a plurality of supported portions are provided at the holder support,
 the cord holder is provided in at least one of the supported portions, and
 the lock mechanism is provided between the holder support and at least one of the supported portions at which the cord holder is not provided.

4. The personal digital assistant attachment structure for a saddle-ride vehicle according to claim 3, wherein
 the supported portion is formed in a rod shape, is inserted into the holder support in the longitudinal direction of the supported portion, and comprises a narrow portion provided on an intermediate portion of the supported portion in the longitudinal direction,
 the holder support comprises a fork advance-retreat mechanism that causes a fork member to move forward and backward in a direction orthogonal to the longitudinal direction and thereby causes the fork member to engage with and disengage from the narrow portion, and the lock mechanism is constituted of the narrow portion and the fork advance-retreat mechanism.

5. The personal digital assistant attachment structure for a saddle-ride vehicle according to claim 2, wherein
 the supported portion is formed in a plate shape, is inserted into the holder support in a direction along a top surface and a back surface of the supported portion, and has a hole portion formed at a predetermined position on the top surface and the back surface,
 the holder support comprises a pin advance-retreat mechanism that is used to cause a pin to move forward and backward in a direction orthogonal to the top surface and the back surface, and attach the pin to the hole portion and remove the pin from the hole portion, and
 the lock mechanism is constituted of the hole portion and the pin advance-retreat mechanism.

6. A personal digital assistant attachment structure for a saddle-ride vehicle, removably attaching a personal digital assistant including a display screen to a vehicle body,
 the attachment structure comprising:
 a terminal holder that comprises a connector cord and a supported portion, is provided separately from the vehicle body, is removably provided on the vehicle body, and holds the personal digital assistant, the connector cord comprising a first end and a second end different from the first end, the first end being connected to the personal digital assistant so that the first end is capable of supplying at least one of electric power and data to the personal digital assistant from the vehicle body, the supported portion comprising a cord holder and a holder terminal, the supported portion fixedly holding the holder terminal, the cord holder holding the connector cord, the holder terminal being connected to the second end of the connector cord;
 a holder support that is provided integrally with the vehicle body, is removably engaged with the supported portion and to support the terminal holder, and comprises a vehicle-body-side terminal, the vehicle-body-side terminal being removably connected to the holder terminal during engagement of the supported portion; and
 a vehicle-body-side fixation member provided at an attachment position of the personal digital assistant, wherein
 the terminal holder further comprises: a case capable of accommodating the personal digital assistant; a spacer that is selected so as to match to the personal digital assistant and is accommodated in the case; a cover that covers an opening of the case; and a hinge that pivotally supports the cover so to be openable and closable with respect to the case,
 the supported portion is formed integrally with the terminal holder, and
 an engagement portion that is to be engaged with the cover in a state where the case is closed during attachment of the terminal holder and thereby limits an operation of opening the cover is provided on the vehicle-body-side fixation member.

7. The personal digital assistant attachment structure for a saddle-ride vehicle according to claim 1, wherein
 the terminal holder comprises a seal that is provided along an inner circumferential edge of a window of the cover so as to come into tight contact with the periphery of a display screen of the personal digital assistant inside the case when the cover is closed.

8. The personal digital assistant attachment structure for a saddle-ride vehicle according to claim 6, wherein
 the terminal holder comprises a seal that is provided along an inner circumferential edge of a window of the cover so as to come into tight contact with the periphery of a display screen of the personal digital assistant inside the case when the cover is closed.

9. A personal digital assistant attachment structure for a saddle-ride vehicle, removably attaching a personal digital assistant including a display screen to a vehicle body,
 the attachment structure comprising:
 a terminal holder that comprises a connector cord and a supported portion, is provided separately from the vehicle body, is removably provided on the vehicle body, and holds the personal digital assistant, the connector cord comprising a first end and a second end different from the first end, the first end being connected to the personal digital assistant so that the first end is capable of supplying at least one of electric power and data to the personal digital assistant from the vehicle body, the supported portion comprising a cord holder and a holder terminal, the supported portion fixedly holding the holder terminal, the cord holder holding the connector cord, the holder terminal being connected to the second end of the connector cord; and a holder support that is provided integrally with the vehicle body, is removably engaged with the supported portion and to support the terminal holder, and comprises a vehicle-body-side terminal, the vehicle-body-side terminal being removably connected to the holder terminal during engagement of the supported portion, wherein a light receiver that is used to capture an image of a front of the vehicle is provided on a front surface of the personal digital assistant during attachment thereof to the vehicle body, and an exposed hole that allows the light receiver to be exposed to the front of the vehicle is provided on the terminal holder.

\* \* \* \* \*